US007224801B2

(12) United States Patent
Abdo et al.

(10) Patent No.: US 7,224,801 B2
(45) Date of Patent: May 29, 2007

(54) WIRELESS SECURE DEVICE

(75) Inventors: Samer Abdo, Preverenges (CH); Rolf Ambuehl, Lausanne (CH); Olivier Bodenmann, Assens (CH)

(73) Assignee: Logitech Europe S.A. (CH)

( * ) Notice: Subject to any disclaimer, the term of this patent is extended or adjusted under 35 U.S.C. 154(b) by 615 days.

(21) Appl. No.: 09/974,224

(22) Filed: Oct. 9, 2001

(65) Prior Publication Data

US 2002/0080967 A1 Jun. 27, 2002

Related U.S. Application Data

(60) Provisional application No. 60/258,843, filed on Dec. 27, 2000, provisional application No. 60/300,563, filed on Jun. 22, 2001.

(51) Int. Cl.
*H04K 1/00* (2006.01)

(52) U.S. Cl. ........................... 380/270; 380/255

(58) Field of Classification Search ................. 380/270
See application file for complete search history.

(56) References Cited

U.S. PATENT DOCUMENTS

| 4,229,817 | A | * | 10/1980 | Morgan et al. | ............... 380/52 |
| 4,409,479 | A |   | 10/1983 | Sprague et al. | ............. 250/237 |
| 4,428,078 | A |   | 1/1984  | Kuo | ................. 455/3 |
| 4,521,772 | A |   | 6/1985  | Lyon | ........................... 340/710 |
| 4,586,175 | A |   | 4/1986  | Bedard et al. | ................. 370/85 |
| 4,631,400 | A |   | 12/1986 | Tanner et al. | ................ 250/221 |
| 4,667,087 | A | * | 5/1987  | Quintana | ..................... 235/380 |
| 4,751,505 | A |   | 6/1988  | Williams et al. | ............. 340/710 |
| 4,754,268 | A |   | 6/1988  | Mori | ........................... 340/710 |
| 4,860,292 | A |   | 8/1989  | Newman et al. | ............... 371/32 |
| 4,924,216 | A |   | 5/1990  | Leung | ........................ 340/709 |
| 4,979,095 | A |   | 12/1990 | Ghafari | ..................... 364/200 |
| 5,027,348 | A |   | 6/1991  | Curry, Jr. | .................... 370/85.1 |
| 5,098,110 | A |   | 3/1992  | Yang | ........................... 273/438 |
| 5,222,137 | A | * | 6/1993  | Barrett et al. | ................ 380/271 |
| 5,307,297 | A | * | 4/1994  | Iguchi et al. | ................ 345/169 |
| 5,331,450 | A | * | 7/1994  | Heep et al. | .................... 398/92 |
| 5,339,095 | A |   | 8/1994  | Redford | ........................ 345/158 |
| 5,349,139 | A |   | 9/1994  | Verrier et al. | ................. 178/19 |
| 5,375,119 | A |   | 12/1994 | Koivu | ........................... 370/82 |
| 5,515,051 | A |   | 5/1996  | Tanaka et al. | .............. 341/174 |

(Continued)

FOREIGN PATENT DOCUMENTS

| DE | 3244537 C2 | 8/1984 |
| DE | 4223258 A1 | 1/1994 |
| DE | 19917047 A1 | 10/2000 |
| EP | 0171747 A2 | 2/1986 |
| EP | 0604911 A2 | 6/1994 |
| JP | 4-17495 | 1/1992 |
| JP | 10027057 A | 1/1998 |
| WO | WO 91/07826 | 5/1991 |
| WO | WO 98/56131 | 12/1998 |
| WO | WO 99/14652 | 3/1999 |

OTHER PUBLICATIONS

John E. Hershey, Amer A. Hassan, and Rao Yarlagadda, Unconventional Cryptographic Keying Variable Management, IEEE Transactions on Communications, vol. 43, No. 1, Jan. 1995.

*Primary Examiner*—Nasser Moazzami
*Assistant Examiner*—David Garcia Cervetti
(74) *Attorney, Agent, or Firm*—Fenwick & West LLP

(57) ABSTRACT

A method and apparatus for securely connecting one or more wireless peripheral devices such as keyboards, mice, gamepads, remote controllers, joysticks and one or more host systems such as personal computers or workstations, the secure connection reducing the vulnerability of wireless communications between a wireless peripheral device and a host system to accidental or malicious interference or eavesdropping.

25 Claims, 5 Drawing Sheets

U.S. PATENT DOCUMENTS

| | | | | |
|---|---|---|---|---|
| 5,517,569 | A * | 5/1996 | Clark | 380/52 |
| 5,546,538 | A | 8/1996 | Cobbley et al. | 395/200.01 |
| 5,550,987 | A | 8/1996 | Tanaka | 395/286 |
| 5,581,594 | A | 12/1996 | McAfee | 379/57 |
| 5,621,798 | A | 4/1997 | Aucsmith | 380/25 |
| 5,623,271 | A | 4/1997 | Ponnapalli | 343/895 |
| 5,682,379 | A | 10/1997 | Mahany et al. | 370/311 |
| 5,793,359 | A * | 8/1998 | Ushikubo | 345/169 |
| 5,838,304 | A | 11/1998 | Hall | 345/157 |
| 5,854,621 | A * | 12/1998 | Junod et al. | 345/158 |
| 5,877,745 | A * | 3/1999 | Beeteson et al. | 345/156 |
| 5,881,366 | A * | 3/1999 | Bodenmann et al. | 455/41.2 |
| 5,920,730 | A | 7/1999 | Vincent | 395/834 |
| 5,968,142 | A | 10/1999 | Frederic | 710/18 |
| 6,000,252 | A | 12/1999 | Murray, Jr. et al. | 70/58 |
| 6,014,130 | A | 1/2000 | Yung-Chou | 345/163 |
| 6,021,212 | A | 2/2000 | Ho | 382/124 |
| 6,026,165 | A * | 2/2000 | Marino et al. | 380/273 |
| 6,056,193 | A | 5/2000 | McAuliffe et al. | 235/380 |
| 6,064,702 | A | 5/2000 | Hsien | 375/332 |
| 6,067,076 | A * | 5/2000 | Hocker et al. | 345/158 |
| 6,072,468 | A * | 6/2000 | Hocker et al. | 345/157 |
| 6,078,789 | A | 6/2000 | Bodenmann et al. | 455/66 |
| 6,088,802 | A * | 7/2000 | Bialick et al. | 713/200 |
| 6,097,812 | A * | 8/2000 | Friedman | 380/26 |
| 6,121,957 | A | 9/2000 | Yeh et al. | 345/163 |
| 6,126,546 | A * | 10/2000 | Reed et al. | 463/40 |
| 6,130,946 | A * | 10/2000 | Friedman | 380/26 |
| 6,167,137 | A * | 12/2000 | Marino et al. | 380/255 |
| 6,193,153 | B1 * | 2/2001 | Lambert | 235/380 |
| 6,237,846 | B1 * | 5/2001 | Lowell et al. | 235/145 R |
| 6,243,079 | B1 * | 6/2001 | Liu | 345/168 |
| 6,308,062 | B1 * | 10/2001 | Chien et al. | 455/420 |
| 6,480,745 | B2 * | 11/2002 | Nelson et al. | 607/60 |
| 6,486,875 | B1 * | 11/2002 | O'Donnell, Jr. | 345/179 |
| 6,572,014 | B1 * | 6/2003 | Lambert | 235/380 |
| 6,694,430 | B1 * | 2/2004 | Zegelin et al. | 713/160 |
| 6,741,853 | B1 * | 5/2004 | Jiang et al. | 455/418 |
| 6,742,052 | B2 * | 5/2004 | Himmel et al. | 710/2 |
| 6,744,747 | B2 * | 6/2004 | Shiu et al. | 370/331 |
| 6,760,444 | B1 * | 7/2004 | Leung | 380/270 |
| 6,765,497 | B2 * | 7/2004 | Ablay et al. | 340/905 |
| 6,768,797 | B2 * | 7/2004 | Rose | 380/247 |
| 6,772,331 | B1 * | 8/2004 | Hind et al. | 713/151 |
| 6,778,670 | B1 * | 8/2004 | Sharma et al. | 380/262 |
| 6,782,102 | B2 * | 8/2004 | Blanchard et al. | 380/270 |
| 6,785,748 | B2 * | 8/2004 | Mikuni et al. | 710/15 |
| 6,792,112 | B1 * | 9/2004 | Campbell et al. | 380/270 |
| 6,813,355 | B1 * | 11/2004 | Hakaste | 380/270 |
| 6,816,455 | B2 * | 11/2004 | Goldberg et al. | 370/230 |
| 6,823,461 | B2 * | 11/2004 | Lakshmi Narayanan et al. | 726/13 |
| 6,829,358 | B2 * | 12/2004 | Jiang | 380/272 |
| 6,839,851 | B1 * | 1/2005 | Saitoh et al. | 726/13 |
| 6,925,183 | B2 * | 8/2005 | Jiang et al. | 380/278 |
| 6,934,391 | B1 * | 8/2005 | Linkola et al. | 380/247 |
| 6,940,978 | B2 * | 9/2005 | Parkman | 380/270 |
| 6,952,772 | B2 * | 10/2005 | Deo et al. | 713/170 |
| 6,957,342 | B2 * | 10/2005 | Vatanen | 713/192 |
| 6,996,072 | B1 * | 2/2006 | Minborg | 370/260 |
| 6,999,589 | B2 * | 2/2006 | Cato et al. | 380/270 |
| 7,003,115 | B1 * | 2/2006 | Suzuki et al. | 380/270 |
| 7,003,282 | B1 * | 2/2006 | Ekberg | 455/411 |
| 7,069,446 | B2 * | 6/2006 | Wiederin et al. | 713/189 |
| 2002/0026579 | A1 * | 2/2002 | Wiederin et al. | 713/162 |

* cited by examiner

| X2 | K0 | K1 | K2 | K3 | K4 | K5 | K6 | 0 | 0 | D |

FIG. 3A

| K0 | K1 | K2 | K3 | K4 | K5 | K6 | K7 | K8 | K9 | K10 | K11 | K12 | K13 | K14 | D |

FIG. 3B

WIRELESS SECURE DEVICE

RELATED APPLICATION

This application claims priority under 35 U.S.C. § 119(e) to U.S. Provisional Application Ser. No. 60/258,843 filed Dec. 27, 2000, by Samer Abdo, Rolf Ambuehl, and Olivier Bodenmann, and U.S. Provisional Application Ser. No. 60/300,563 filed on Jun. 22, 2001, by Samer Abdo, Rolf Ambuehl, and Olivier Bodenmann, which are assigned to the same assignee as the present invention and are incorporated, in their entirety, herein by reference.

BACKGROUND

1. Field of Invention

The present invention relates to a method and a system for wireless communication between a peripheral device and a host computer system (host system), and more particularly relates to a method and a system for establishing a secure connection between one or more wireless peripheral device and one or more host systems.

2. Background of the Invention

Numerous methods for connection of peripherals to host systems, e.g., personal computers and workstations are known in the art. For example, corded peripherals, or peripherals connected to host systems using a cable or corded connection through either an industry standard serial (RS-232) or parallel port, are known in the art. As known to one of skill in the art, RS-232 stands for "recommended standard-232C," a standard interface approved by the Electronic Industries Alliance for connecting serial devices. This method, although effective in many circumstances, suffers from certain limitations. One limitation is the restriction on the user's freedom of movement. A second limitation is that host systems have only a limited number of available ports, and thus can only support a limited number of peripheral devices. Another limitation is the clutter and complexity that having a large number of wires or cables brings. An increasing number of peripherals are being connected to host systems bringing a proportional increase in clutter and confusion from the mass of wiring required to connect multiple corded peripherals to a host system. Thus, there has been a need for cordless peripherals.

Cordless peripherals are also known in the art. A common approach uses infrared ("IR") transmissions to connect a peripheral device with a host system. Remote control devices used with modem home electronics such as a television, videocassette recorder or stereo is an example of cordless communication between a peripheral and a host system using infrared signals. While solving some of the limitations of corded peripherals, cordless transmission systems using infrared signals have the limitation of the transmitting peripheral must be aligned with the host system, therefore, obstacles in the line of sight path between the peripheral and the host can hinder a transmission. This limitation makes infrared-based communications unworkable when it is difficult to keep a given peripheral in alignment with the host system.

More recently, other wireless devices have been introduced. For example, cordless peripheral devices, which connect with host systems through radio frequency ("RF") transmission systems, are known in the art. RF technology allows cordless communications between a peripheral and a host system without concern for alignment or obstacles, which could impede infrared communications. While both IR and RF devices have been effective in providing cordless communication between a single peripheral and an associated host, these devices, which generally use a conventional system of identifiers (e.g., Short_ID) to try to ensure data privacy, are vulnerable to interference with configurations in which multiple peripherals wirelessly connect to single or multiple host systems. Such interference can simply be coincidental, a host system might erroneously recognize an unrelated peripheral as an authentic peripheral, or may be intentional in the form of malicious eavesdropping.

Thus, there is a need for a communication device, which would permit elimination of cabled or wired connections between a peripheral and a host system, while providing a secure connection that allows one or more cordless, or wireless peripherals to securely communicate with one or more hosts systems that associated with that wireless peripherals communicate with that host system.

SUMMARY OF THE INVENTION

The present invention overcomes the limitations of the prior art by providing a method for securely connecting one or more wireless peripheral devices and one or more host systems (e.g., personal computers or workstations), the secure connection being highly resistant to coincidental as well as potentially intentional or malicious interference. The secure connection includes an encryption/decryption process to protect communications between the wireless peripheral device and the host system.

The system provides the option between establishing a normal connection or data link or a secure data link between a wireless device and a host system. When operating in a secure connection mode, it is highly improbable that a wireless device can be connected to and communicate with a host system other than the one to which it is intended to be connected. In one embodiment, the process for providing a secured data link includes providing a wireless peripheral device with an encryption key, generated by a host system, without directly transmitting the encryption key to the wireless peripheral device, and validating that an encryption/decryption process of a secure link is operational, again without having to transmit an encryption key directly between the wireless device and the host system. In one embodiment, the wireless devices and a receiver unit coupled to the host system, respectively, internally generate sensitive information such as a device identifier and the encryption key. This internal generation of sensitive information makes it difficult for an eavesdropper to force a given value to the identifier or the encryption key.

In another embodiment, the present invention also provides a process for guiding a user through a secured link process, as well as for monitoring the status of the secured link, informing a user of the status of the data link (e.g., normal link (mode) or secured link (mode)), and for warning the user if the security mode is switched off without permission being granted.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The Figures depict embodiments of objects and features of the present invention(s) and are for illustration purposes only. The Figures are more fully disclosed in the following detailed description, reference being had to the accompanying drawings, in which:

FIG. 3A is an illustration of a standard keyboard data format.

FIG. 3B is an illustration of an encrypted keyboard data format.

DETAILED DESCRIPTION OF THE INVENTION

Reference will now be made in detail to several embodiments of the present invention(s), examples of which are illustrated in the accompanying drawings. It is noted that wherever practicable similar or like reference numbers may be used in the figures and may indicate similar or like functionality. One of skill in the art will readily recognize from the following discussion that alternative embodiments of the structures and methods disclosed herein may be employed without departing from the principles of the invention(s) disclosed herein.

It is noted that, for ease of discussion, the following descriptions of the present invention are made with reference to connecting a wireless keyboard 115 to a host system 101, which merely represents one embodiment of the present invention. Those of skill in the art will recognize that the principles described are also applicable to connecting other wireless peripheral devices, such as wireless mice, trackballs, gaming devices, joysticks, and cameras to a host system 101.

System Architecture

The present invention includes a system and method for establishing one or more simultaneous secure connections or data links between one or more wireless peripheral devices and one or more host systems 101.

Figure 1:
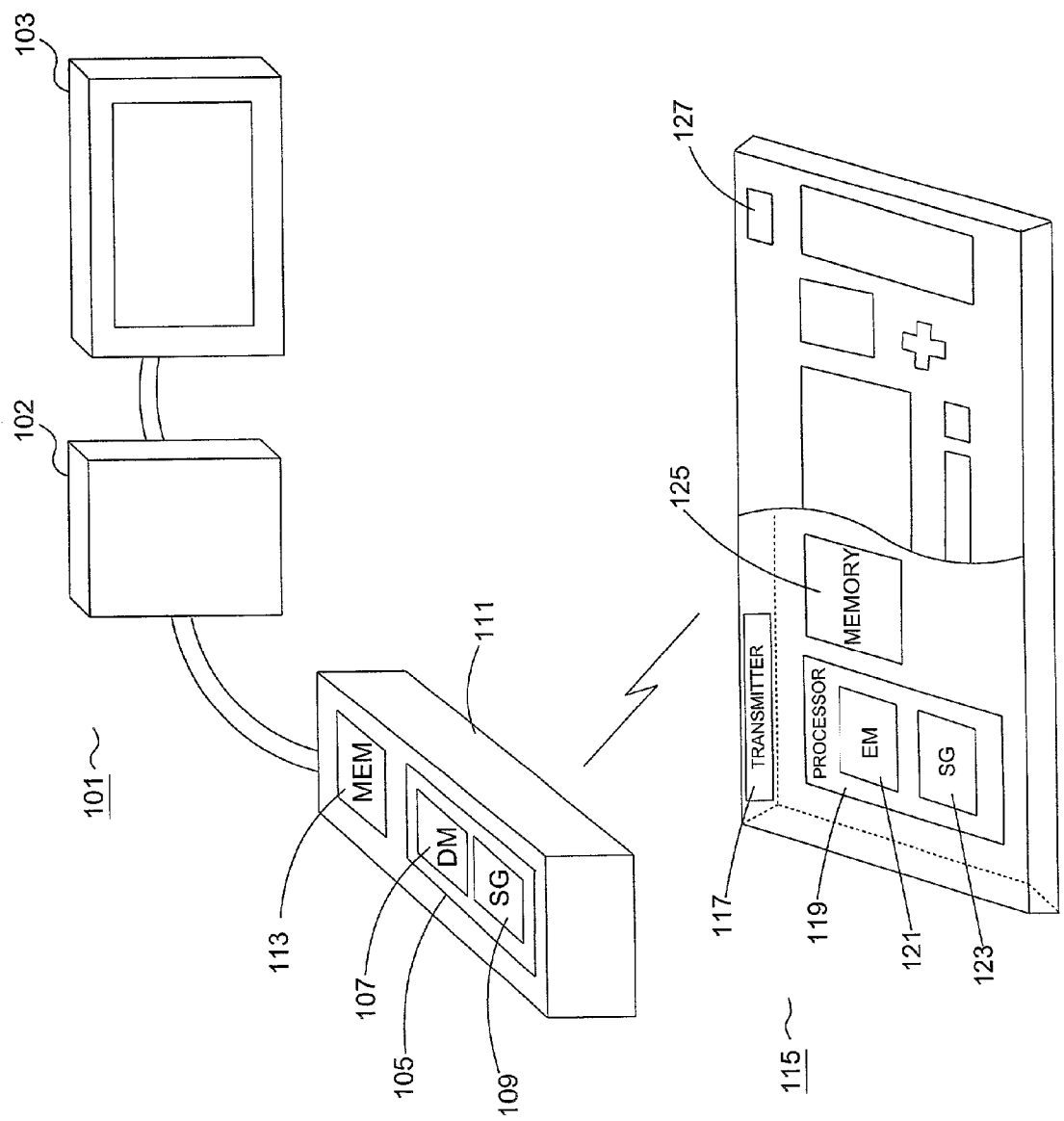
FIG. 1 is an illustration of a wireless peripheral device, such as a keyboard, and a host system 101, such as a computer.

Referring first to FIG. 1, a wireless peripheral device, for example, a wireless keyboard 115, communicates wirelessly with a host system 101, typically a handheld computer, a personal computer, or a workstation. In addition to a keyboard, other suitable peripheral devices 115 may include, for example, electronic mice, trackballs, touchpads, joysticks, game controllers, game pads, and digitized tablets and pointing devices used in software presentations.

In one embodiment, the wireless keyboard 115 includes a memory 125, which can be volatile (e.g., random access memory) or non-volatile, for example, an Electrically Erasable Programmable Read-Only Memory or a flash chip, a processor 119 including an encryption module 121 and a signal generator 123, and a transmitter 117. The memory 125, and the processor 119 including an encryption module 121 and a signal generator 123, and a transmitter 117 are further described below.

The host system 101 includes a receiver or host adapter 111, a host computer 102, and a display unit 103, for example a screen such as a computer monitor. The receiver 111 is coupled to the host computer 102, and the host computer 102 is coupled to the display unit 103. In one embodiment, the components of the host system 101 are connected via USB links. In addition, the receiver 111 includes a non-volatile memory 113, and a processor 105 including a signal generator 109 and a decryption module 107. The host computer 101, the receiver 111, which includes memory 113, the processor 105 including the signal generator 109 and the decryption module 107, and the display unit 103 are further described below. Additional embodiments of a wireless peripheral device/transmission unit, for example, a wireless keyboard 115 and receiver/host adapter 111 is described in U.S. Pat. No. 5,854,621, entitled WIRELESS MOUSE and assigned to the assignee of the present invention, the relevant portions of which are incorporated herein by reference.

In an additional embodiment, the keyboard 115 includes a connection button 127, with which to initiate a connection with the host system 101. Furthermore, while FIG. 1 describes one embodiment of the present invention in which the keyboard 115 communicates uni-directionally to the host system 101, in another embodiment, the present invention supports bi-directional communications between a keyboard 115 and a host system 101 and each device may include both a transmitter and a receiver 111.

A method of the present invention is equally applicable to infrared (IR) or radio frequency (RF) operations. In one embodiment, in addition to JR operations, the Infrared Data Association (IRDA) standard operations may be used to implement the system. If an JR implementation is applied, the carrier wavelength will typically be within the range of 850–950 nm, and may be within the IRDA range of 850–900 nm. The carrier frequency may vary widely, but will typically fall within the range of 30–56 kHz. The LED-on time typically varies between 3 µs to 50% of the carrier period. A shorter on time provides better power savings, while a longer on time provides better range, with the exact on time being determined in accordance with a specific implementation. In some instances, adaptive criteria may be used to determine on time. Any suitable modulation technique is acceptable, such as FSK (Frequency Shift Keying), PSK (Phase Shift Keying), Q-PSK (quadrature phase shift keying) or others, although ASK (Amplitude Shift Keying) is presently preferred because components implementing this technique are readily available. A variety of data encoding algorithms may be used. Certain embodiments of data encoding algorithms that the system may utilize are disclosed and described in U.S. Pat. No. 6,078,789, entitled WIRELESS PERIPHERAL INTERFACE, which is assigned to the assignee of the present invention, the relevant portions of which are incorporated herein by reference. In one embodiment, Miller "Delay Modulation" encoding is preferred, at a rate on the order of 2400 bps and a no-emission time of 2.5 bits minimum at the receiver 111 side. Any suitable directivity may be used, with such directivity controlled in a manner known in the art. In the event the system 101 utilizes a RF link between the keyboard 115 and the host system 101, the system 101 can utilize various carrier frequencies. For example, carriers on the order of 233

MHz, 433.92 MHz, 916.5 MHz, or 2.4 GHz, as well as other frequencies are suitable. In a preferred embodiment, the system 101 utilizes a carrier frequency in the lower frequency bands, typically under 100 MHz and between 20–50 MHz, e.g., 27 MHz, although any suitable frequency will be acceptable. While ASK modulation is presently preferred, as noted above in connection with the JR implementation, other known forms of modulation are also acceptable. Also as with the IR implementation, data encoding using Miller "Delay Modulation" with determined start and end sequences is presently preferred, to assist the AGC (Automatic Gain Control) of the receiver 111 circuitry in obtaining better reception of the incoming signal. It is noted that communications between a wireless keyboard 115 and a host system 101 may be uni-directional (i.e., communication from keyboard 115 to host 101 only) or bi-directional.

In one embodiment of the present invention, for a keyboard 115 to communicate with the host system 101, the system first establishes a communication protocol. First, the host system 101 assigns each of the various wireless devices 115, which communicates with the host system 101 a latency period. Next, for each of the various devices 115, to reflect each of a number of user actions, including depressing a key or releasing a key on a keyboard 115, moving a pointing device, and so on, each device, using its signal generator 123, generates a report to transmit to the host system 101. The system assigns each of the reports emitted by each of the various device types 115 a maximum report period and maximum report durations. Additional embodiments of latency periods, report periods, and report durations are described in U.S. Pat. No. 6,078,789, entitled WIRELESS PERIPHERAL INTERFACE, which is assigned to the assignee of the present invention, the relevant portions of which are incorporated herein by reference.

Data Format

Figure 2A:
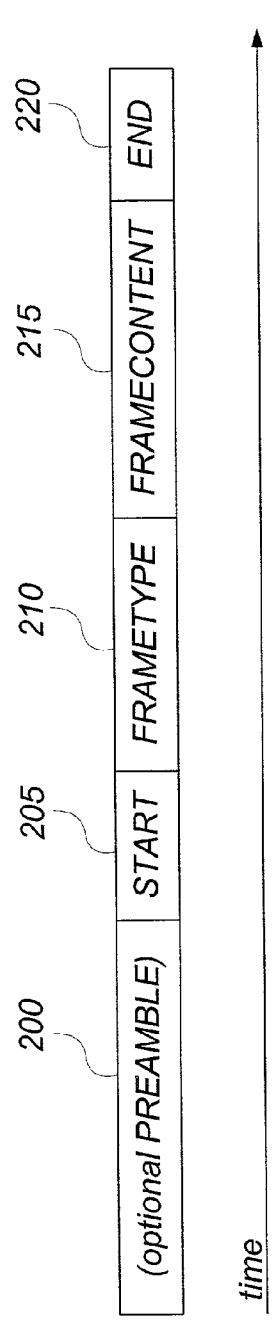
FIG. 2A is an illustration of a general frame structure of a transmission according to the protocol of the present invention.

General Frame Structure of Transmissions Between a Wireless Peripheral Device and a Host System Regardless whether IR and RF carriers are used, reports or messages sent between the peripheral and the host in accordance with the protocol of the present invention all have a common frame structure or data format, shown in FIG. 2A. In one embodiment, the general frame structure of a message sent in accordance with the present invention includes an optional PREAMBLE 200, a START field 205, a FRAMETYPE field 210, a FRAMECONTENT field 215, and an END field 220. The optional PREAMBLE 200, as well as the START and END fields 205 and 220, respectively, are all determined in accordance with, for example, the Miller "Delay Modulation" encoding algorithm. The START field 205 may be of any suitable type, with the intent that it be easily recognizable as a start sequence while also providing synchronization information. The FRAMETYPE field 210 is typically of a variable length, organized in a tree structure, which reserves the shortest FRAMETYPEs to the frames that have to convey the fastest or shortest messages.

Figure 2B:
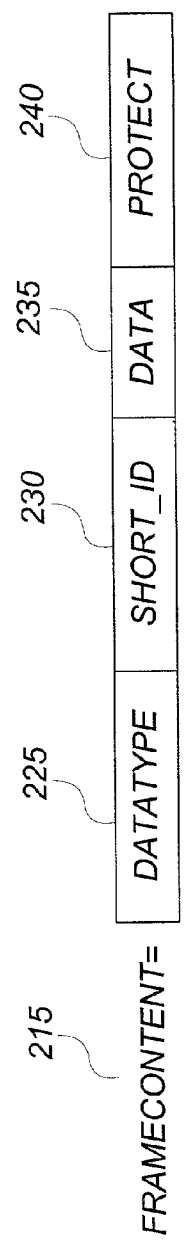
FIG. 2B is an illustration of the contents of the FRAME-CONTENT field available in accordance with the protocol of the present invention.

The next field of a message is the FRAMECONTENT field 215, an exemplary structure of which is shown in FIG. 2B. The FRAMECONTENT field includes, in its typical form, a DATATYPE field 225, a SHORT_ID field 230, a DATA field 235, and a PROTECT field 240. However, the content, format and bit count of the SHORT_ID 230 field and of the DATA field 235 will depend on the value of the DATATYPE field 225. The DATATYPE and SHORT_ID fields 225 and 230 typically identify the source of a device transmission.

Figure 6:
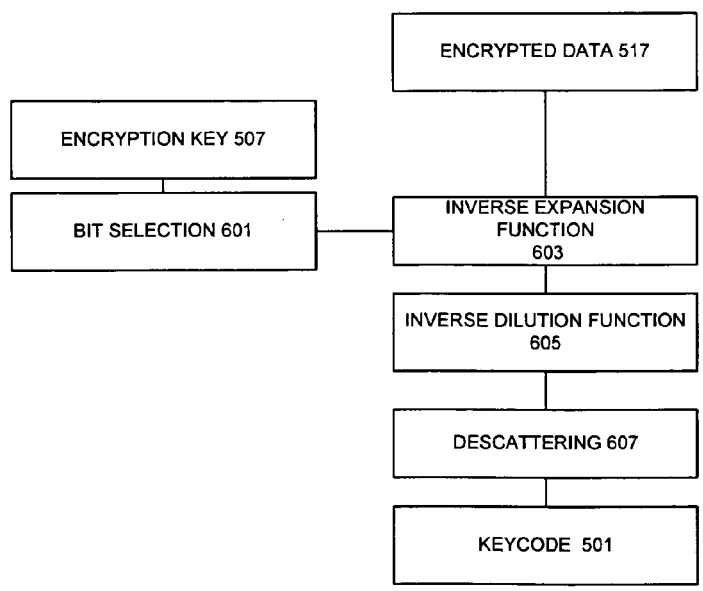
FIG. 6 is a flow diagram of one embodiment of a decryption process in accordance with the present invention.

In an exemplary embodiment, the DATATYPE field 225 may not be used during communication with polled or synchronized devices 115. However, it may be used with other transmissions regardless of whether the direction of the communication is keyboard 115 to host system 101 in general, or host system 101 to keyboard 115 in bi-directional mode. The DATATYPE field, as shown in FIG. 6, is classified hierarchically in terms of the associated report rate; that is, devices 115 having more serious time constraints get higher priority and shorter DATATYPE fields (as well as the shortest SHORT_ID field 230). For example in one embodiment, unidirectional gamepads 605, unidirectional joysticks 610 and two-dimensional pointing devices 115 (such as mice and trackballs) 615 are assigned such highest priority.

The next field included in the FRAMECONTENT field shown in FIG. 3 is the SHORT_ID field. The SHORT_ID field stores a string of bits, the string of bits acting as an identifier for a particular wireless peripheral device. In one embodiment, the SHORT_ID stores identifying codes 12 bits in length. The SHORT_ID field permits the host receiver 111 to recognize and separate messages coming from two or more devices. As noted above with DATATYPE, in one embodiment, synchronized or polled peripheral devices do not emit a SHORT_ID at all since they emit only when the host receiver 111 expects them to.

Figure 5:
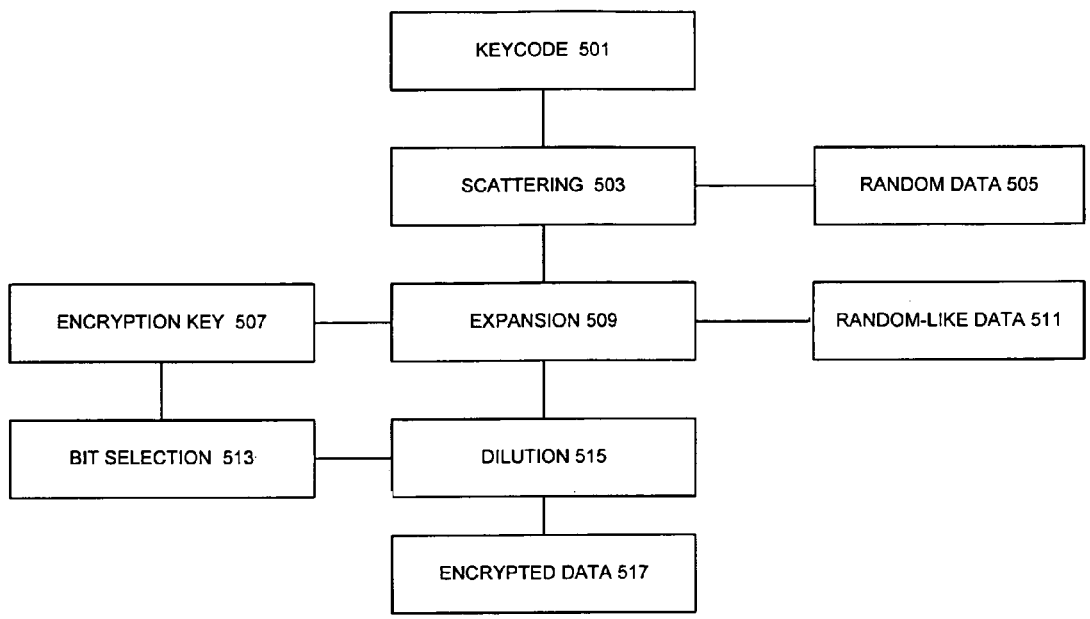
FIG. 5 is a flow diagram of one embodiment of an encryption process in accordance with the present invention.

The next field referred to in the FRAMECONTENT structure of FIG. 5 is the DATA field 235. The format of the DATA field 235 will vary with the type of wireless peripheral device and the type of message. Since the content of the DATA field can vary with the wireless device, different data structures are used for the DATA field for different devices 115. The last remaining field in the FRAMECONTENT field is the PROTECT field 240. In an exemplary embodiment, the PROTECT field provides CRC protection of four bits length.

Additional embodiments for a protocol that the host system 101 uses to transmit reports, and a suitable FRAME STRUCTURE, including details on START, FRAME TYPE, FRAMECONTENT, DATATYPE, SHORT_ID and DATA fields is described in U.S. Pat. No. 6,078,789, entitled WIRELESS PERIPHERAL INTERFACE, which is assigned to the assignee of the present invention, with the relevant portions of which are incorporated herein by reference.

Comparison of Frame Content in a Standard Connection and a Secured Connection

FIG. 3A is an illustration of a standard keyboard 115 DATA field format for a unidirectional keyboard 115. Unidirectional keyboards 115 can be described as asynchronous, encoded key switches, which transmit a report to the host system 101 any time a key is depressed or released. Each depression or release of a button on the keyboard 115 generates a report that is sent to the host system 101. Each report has the frame structure described above. The DATA field contains the data that represents each depression and release of a button on the keyboard 115, which button was depressed or released, and whether it was depressed or released. Each key depression or release is represented in the DATA field by: 1) one or more "keycodes," a predetermined number of bits (e.g., 8 bits) that represent what key was depressed or released, and 2) a one "button depressed/released" bit, which can be set to a one if the report represents that a button has been depressed, or a zero if the report represents that the button was released.

In one embodiment the wireless keyboard 115 and the host system 101 connect either through a standard or normal connection, or through a secured connection. In one embodiment, for each of the two connection modes, the system 101 applies different frame contents. The process of establishing a standard and secure connection is described in the next section.

In the exemplary embodiment of FIG. 3A, a standard keyboard 115 DATA field format includes a keycode that can represent 127 different physical keys of the keyboard 115 on seven bits (K0–K6). The DATA field format also includes an extension flag X2, two additional function bits set at 00 until needed, and one "button depressed/released" bit, D. Extension flag X2 that may be used to represent "upper" key codes, key codes beyond 127, e.g., 128 through 255. In total, this embodiment of a normal keyboard DATA field comprises 11 bits of data. In addition, the standard keyboard frame structure includes a binary DATA TYPE of five bits, for example, 00010.

FIG. 3B is an illustration of an encrypted keyboard DATA format. When the system 101 operates in a secured connection mode, in one embodiment, the system 101 first represents a report from a wireless keyboard 115 of a button depression or release in a 9-bit format: 8-bits representing 255 different possible key codes, seven bits representing 127 different physical keys, and the eighth bit represents an extension flag that may be used for "upper" keys, e.g., 128 through 255, and one "button depressed/released" bit, D. Next, the keyboard 115 utilizes the encryption module 121 to scramble each 8-bit keycode, and transform the original 8-bit keycode into 15-bits of data. FIG. 3B represents one embodiment of an encrypted keyboard 115 DATA field, which includes, for example, a 15-bit code (K0–K14), an expansion of an original 8-bit keycode that represents one of 255 possible keycodes, and one "button depressed/released" bit, D. In total, the encrypted keyboard DATA field may comprise, for example, 16 bits of data. In addition, the encrypted keyboard frame structure includes a binary DATA TYPE of two bits, for example, 10.

Thus, in one embodiment, the encrypted keyboard DATA field comprises, for example, 16 bits, in contrast to the standard keyboard DATA field, which comprises 11 bits. In addition, the encrypted keyboard DATA TYPE is coded on fewer bits, e.g., 2 bits, in contrast to the 5 bits that the standard keyboard DATA TYPE is coded on. Therefore, these differences in DATA field and DATA type allow the encrypted keyboard FRAME CONTENT to be overall only two bits longer than the standard keyboard FRAME CONTENT, which in one embodiment, only results in a few microseconds (e.g., 830 microseconds) differential in transmission time. This small differential in transmission time allows the system to maintain a high transmission rate even when transmitting encrypted key reports.

In another embodiment, the system 101 may utilize bi-directional keyboards or devices 115 to communicate with a host system 101. Bi-directional keyboards 115 may be generally thought of as polled encoded key switches that work only in bi-directional mode when polled by a host system 101. At each polling the keyboard 115 communicates any and all reports generated for keys that were depressed or released after the previous polling. The bi-directional keyboard DATA field is similar to that of a uni-directional keyboard DATA field.

Process of Establishing a Secure Connection Between a Wireless Peripheral Device and a Host System.

The present invention provides multiple connection modes to connect a wireless keyboard 115 to a host system 101. One of the connection modes that the present invention provides is a secure connection mode, which may be referred to as a "SECURED" connection, session, or link. Another connection mode is a normal, standard, or plain connection mode, which may be referred to as a "NORMAL" connection, link, or mode. The purpose of the secured connection mode is to provide a medium of communication between a wireless keyboard 115 and a host system 101 that is difficult for an unauthorized third party device to eavesdrop on, disrupt, or participate in. The SECURED connection provides a connection between a wireless keyboard 115 and a host system 101 that minimizes the probability that an unauthorized third party device may be able to communicate with the host system 101, and minimizes the probability that a communication from the wireless keyboard 115 can be received and processed by an unauthorized host system 101. The following sections describe a number of embodiments of processes by which the present invention establishes NORMAL and SECURED connections between a wireless keyboard 115 and a host system 101.

Standard Connection

The NORMAL connection mode may be defined as a non-secured connection. In one embodiment, the system 101 establishes a NORMAL "out-of-the box" connection when a freshly powered wireless keyboard 115 (e.g., batteries just inserted) is placed in the vicinity of a "blank receiver", e.g., a receiver 111 that has previously never been connected with the wireless keyboard 115. In one embodiment, once the wireless keyboard 115 has access to a power source and is placed in the vicinity of a blank receiver, within 30 minutes of the peripheral device's 115 access to a power source the wireless keyboard 115 sends status messages to the receiver 111 requesting connection. In one embodiment, to establish this NORMAL "out-of-the box" connection, the wireless peripheral transmits its SHORT_ID to the receiver 111. Next, the receiver 111 stores the SHORT_ID of the wireless keyboard 115 in the receiver's 111 memory 113 and then utilizes that SHORT_ID to recognize messages sent by that wireless keyboard 115.

In another embodiment, a user initiates the process of establishing a NORMAL connection by using a connection mechanism. In one embodiment, the connection mechanism may be a connection button 127 that resides on the wireless keyboard 115 and another connection button that resides on the receiver 111. The user initiates the process of establishing a NORMAL connection by depressing both connection buttons, one on the wireless keyboard 115 and one on the receiver 111, which causes the wireless keyboard 115 and the host system 101 to transmit data between them to establish the NORMAL connection. In one embodiment, a NORMAL the connection must be established within a given time frame (e.g., 10 seconds).

Once a NORMAL connection has been established, the key reports generated by the wireless keyboard 115 retrieves the SHORT_ID from memory 125 and attaches it to each key report and message it transmits to the host system 101. The host system 101, which has stored the same SHORT_ID in the receiver 111 memory 113, checks to make sure that the SHORT_ID's match, before recognizing and processing messages received from the wireless keyboard 115. In one embodiment, since the SHORT_ID is stored in non-volatile memory 113 and memory 125, the wireless keyboard 115/receiver 111 pair remains connected even after the host computer has been turned off and on multiple times.

Secure Connection Process

In one embodiment, once a NORMAL connection has been established, the system 101 is able to switch the connection between the wireless keyboard 115 and the host system 101 to a SECURED mode. In one embodiment, a SECURED connection can be established between a wireless keyboard 115 and a host system 101 without the need to first establish a NORMAL connection. Generally, in one embodiment, a process for establishing a secure connection includes a user deciding to establish a SECURED connection. A user may establish a SECURED connection by first acting on a wireless keyboard 115, by first acting on a host system 101, or by acting directly on a software component residing on the host computer 102 and displayed through the display unit 103.

Figure 4:
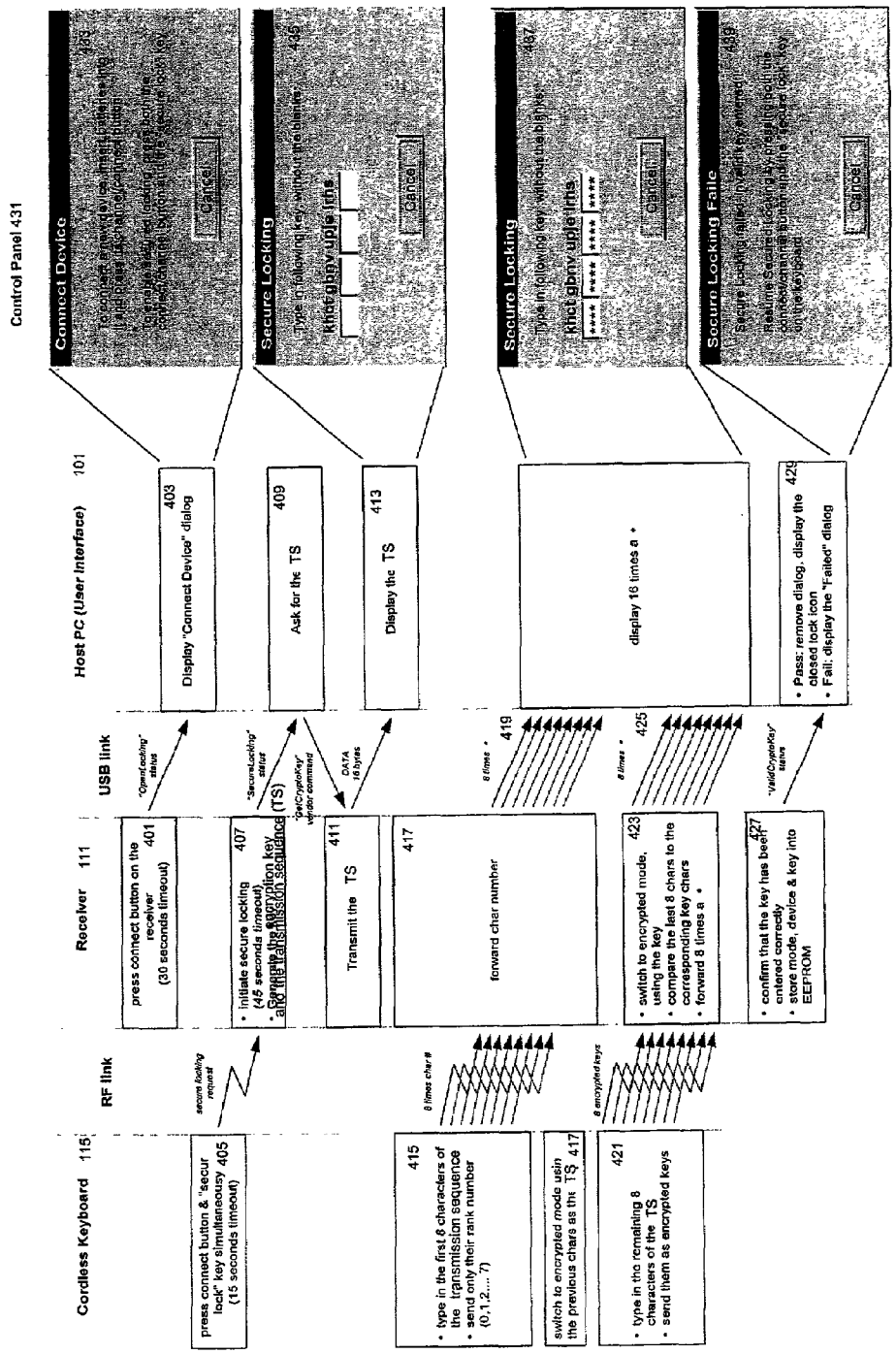
FIG. 4 is an illustration of a process of establishing a secure connection in accordance with the present invention.

FIG. 4 is an illustration of a process of establishing a secure connection in accordance with one embodiment of the present invention. A user initiates the process of establishing a SECURED connection by first depressing 415 a secure connect button, or its equivalent, on a wireless keyboard 115. In one embodiment, the wireless keyboard 115 may have a dedicated secure connect button. In another embodiment, the normal connect button 127 may be used in conjunction with an additional button, for example, a keyboard 115 'Ctrl' button. In yet another embodiment, the depression of a combination of basic keys, e.g., Ctrl+Alt+F12, on the wireless keyboard 115 initiates a secure connection process. The depression of one of these combinations causes the wireless keyboard 115 to transmit a status message requesting a SECURED connection to the receiver 111. In one embodiment, next, the user needs to depress 401 a connection button located on the receiver 111. In another embodiment, instead of depressing a connection button located on the receiver 111, the user interacts with a software component, a user interface window, which can be thought of as a control panel 431, displayed on the display unit 103, and selects a secure connect icon presented in the control panel 431. In either embodiment, after the correct combination of actions is completed, the receiver 111 forwards the "secure locking request" to a software component that opens a control panel 431 (if not already previously opened) associated with the wireless keyboard 115/receiver 111 combination, a user interface window, which guides the user through the rest of the process of establish a SECURED connection.

In another embodiment, a user initiates the process of establishing a SECURED connection by first pressing 401 a connect button on the receiver 111, or a similar connection mechanism. Next, the host computer 102 directs a display unit 103, for example a screen such as a computer monitor or keyboard display, to open a control panel 431 and display 403 a "connect device" dialog 433, which instructs a user to press a dedicated secure connect button on the wireless keyboard 115, or alternate secure connect combination of buttons. In one embodiment, the display unit 103 instructs a user to first connect the wireless keyboard 115 in a NORMAL connection mode prior to initiating the process of establishing a SECURED connection. Following the instructions of the display unit 103, a user simultaneously presses 405 the connect button 127 and an additional secure lock button on the wireless keyboard 115, which transmits a secure connection, or secure locking request to the receiver 111. Once the secure locking request is received, the system can continue with the process of establishing a SECURED connection.

In yet another embodiment, the user directly initiates a SECURED connection process by acting on a software component, which will initiate the SECURED connection process and send a secured locking request to the receiver 111. In one embodiment, each time a the wireless keyboard 115 requests a SECURED connection, regardless of whether the user acts on the wireless keyboard 115 first, or on the receiver 111 first, the wireless keyboard 115 generates a new random SHORT_ID and transmits the new SHORT_ID, along with the secure connect signal, to the receiver 111. The receiver 111 stores this new SHORT_ID in memory 113.

Next, upon receipt of the secured locking request, the receiver 111 randomly generates 407 an encryption key, and a transmission sequence, a string of some predetermined number, e.g., 16, of alphanumeric (e.g., numbers, alphabet letters, or some combination thereof) characters, wherein the first half of the string of alphanumeric numbers represents the encryption key, and the second half of the string represents a confirmation sequence. The encryption key may be generated using conventional methods known in the art such as a pseudo-random number generator, hash algorithms, and microcontroller hardware timer. In addition, the system can utilize various encryption key lengths. For example, encryption key lengths of 32-bits, and 128-bits, as well as other encryption key lengths are suitable. Next, the system stores the encryption key in the receiver's memory 113. The host computer 102 then requests 409 that the receiver 111 transmit the generated encryption key to the host computer 102, and the receiver 111 transmits 411 the encryption key to the host computer 102. Next, the host computer 102 directs the display unit 103 to display 413 the transmission sequence. The display unit 103 then displays the transmission sequence along with user instructions through a window 435 in the control panel 431 user interface. The display 103 requests that the user input the transmission sequence into a peripheral device, e.g., the keyboard 115.

Next, the user types 415 the buttons of the wireless keyboard 115 that correspond to characters displayed in the first half of the transmission sequence, e.g., 8 characters, which represents the encryption key. The wireless keyboard 115, then uses the input alphanumeric characters to reconstruct the encryption key, and stores the encryption key in memory 125. In one embodiment, the alpha numeric characters that represent the encryption key and are displayed by the display unit 103 are chosen from among alpha numeric characters which are represented by keys on a keyboard 115, e.g., whose positions do not vary from one keyboard 115, e.g., layout to another. In another embodiment, the display unit 103 may use any alphanumeric characters to represent the encryption key, even alphanumeric characters whose position do vary from one keyboard to the next.

Since the characters of the first half of the transmission sequence, e.g., 8 characters, that are typed into the wireless keyboard 115 represent the encryption key, to prevent the encryption key from being directly transmitted from the wireless keyboard 115 to the host device 101 over the connection, which would increase the chance that the encryption key could be intercepted by a third party, thus compromising the security of the system, for each character typed into the wireless keyboard 115 that matches the first half of the transmission sequence, the keyboard 115 may not generate a standard report. Generally, a standard report may represent, describe and transmit what character was typed. Alternatively, for the characters that represent the encryption key, e.g., the first half of the transmission sequence, reports are generated that either represent the "*" character, or that represent the rank numbers (0,1,2, . . . ) of the characters typed. The keyboard's 115 transmitter 117 then transmits theses alternate reports to the receiver 111 of the host system 101. The receiver 111 receives 417 these reports, transmits 419 them to the host computer 102. The host computer 102 then directs 419 the display unit 103 to display the received reports, and the display unit 103 displays each report of a button depression as, for example, a generic character such as "*", or the rank order of the reports received (e.g., 0 . . . 7) in a dialog box 437 of the control panel 433.

Once the wireless keyboard 115 has reconstructed the encryption key from the first half of the displayed transmission sequence, the keyboard 115 switches 417 to an encryption mode, using the stored encryption key. Next, the user types 421 the remaining second half of the transmission sequence, also referred to as the confirmation sequence, e.g., 8 characters into the wireless keyboard 115. The signal generation module 123 of the keyboard 115 then generates standard keyboard reports, of the type previously described, to represent the buttons of the keyboard 115 that were depressed. The encryption module 121 of the keyboard 115, then encrypts the generated reports, or more particularly, encrypts the generated keycodes of the reports generated. The transmitter 117 of the keyboard 115 then transmits these encrypted reports to the host system 101.

Next, to determine that the keyboard 115 and the receiver 111 are utilizing the same encryption key, and that the encryption and decryption process is working, the receiver 111 decrypts the encrypted reports received using the stored encryption key, and compares the decrypted message with the second half of the transmission sequence, which is a confirmation sequence. If these two strings of characters (i.e., the decrypted confirmation sequence and the original second half of the transmission sequence) match, the system 101 is able to validate the encryption key, confirming that the same encryption key was used, and that the secure connection process is now successfully completed.

In one embodiment, the user inputs the entire transmission sequence in one step, instead of in two. For example, once the display unit 103 displays the transmission sequence, a user inputs the entire transmission sequence, e.g., 16 alphanumeric characters. Next, the keyboard 115 applies the first half of the input, e.g., 8 characters, to reconstructing the encryption key, and then encrypts the second half of the input with the reconstructed encryption key. This is done without having the user first input the first half of the transmission sequence, then allowing the keyboard 115 to reconstruct the encryption key and transmit key reports that represent the first half of transmission sequence (e.g., *), after which the display unit 103 would request that the user input the second half of the transmission sequence. The user instead inputs the entire transmission sequence, e.g., 16 alphanumeric characters, and the system completes the rest of the process of confirming a SECURED connection (e.g., having the keyboard 115 reconstruct the encryption key, encrypt the confirmation sequence using the encryption key, transmit the encrypted confirmation sequence, and then having the receiver decrypt the encrypted confirmation sequence and match it to the second half of the transmission sequence.).

Upon receipt of these encrypted reports, the receiver 111, which has also switched to encrypted mode, retrieves the encryption key from memory 113, and uses it to decrypt the encrypted reports. Next, the receiver 111 compares 423 the alpha numeric characters that the decrypted codes represent with the alphanumeric characters of the second half of the transmission sequence, e.g., 8 characters. Regardless of whether the characters match, for each character received, e.g., 8, the receiver 111 forwards 425 an "*" to the host computer 102. The host computer 102 then directs the display unit 103 to display an "*" in the control panel 431 for each character received. If the characters match, the receiver 111 confirms 427 the match, which completes the process of establishing a secure connection.

If the characters match, the receiver 111 will notify the host computer 102 that the keyboard 115 has successful applied the correct encryption key, and the encryption/decryption process is valid. The host computer 102 then directs 429 the display unit 103 to remove the control panel 431 dialog and instead display a confirmation (e.g., a closed lock icon) that a SECURED connection between the wireless keyboard 115 and the host system 101 has been successfully established.

If the two sequences of characters (i.e., the decrypted confirmation sequence and the original second half of the transmission sequence) do not match, possibly due to mistyping on the transmission sequence on the user's part, a transmission error, or other reasons, the receiver 111 notifies the host computer 102 that the sequence do not match. The host computer 103 then directs the display unit 103 to display a "failed" dialog 439 on the control panel 431 interface that notifies the user that the attempt to establish a SECURED connection has failed. The dialog also directs the user to re-initiate the process of establishing a SECURED connection. In an alternate embodiment, if a NORMAL connection was previously established and an attempt to establish a SECURED connection fails, the system can return to a NORMAL connection and process communications without encrypting reports sent from the keyboard 115 to the host system 101. Before returning to a NORMAL connection, the user will be notified that the attempt to establish a SECURED connection has failed and given the choice to conduct another attempt to establish a SECURED connection, or instead proceed with a NORMAL connection.

In one embodiment, the transmission sequence (e.g., a 16 character string) contains an error detection or internal consistency mechanism (e.g., a checksum or a cyclic redundancy check). In one embodiment, the last two characters (e.g. in the $15^{th}$ and $16^{th}$ characters) serve as a checksum for the transmission sequence. During an attempt to establish a SECURED connection, the error detection mechanism allows the keyboard 115, after the transmission sequence is entered into it, to verify the consistency of the transmission sequence entered. In one embodiment in which the system utilizes a checksum for error detection, the numerical value stored in the checksum is based on the 14 other characters of the transmission sequence. After the transmission sequence is entered into the keyboard 115, the keyboard 115 can re-compute the checksum based on the first 14 characters of the transmission sequence entered and compare it to the checksum stored in the last 2 characters of the transmission sequence. If the recomputed checksum does not match the numerical value stored in the checksum, the entered transmission sequence is considered invalid, and the system terminates the process of establishing a SECURED connection. If a NORMAL connection was previously established and the error detection mechanism determines that an invalid transmission sequence has been entered, the system can return to a NORMAL connection and process communications without encrypting reports sent from the keyboard 115 to the host system 101. As an alternative, the system notifies the user that an invalid transmission sequence was entered, and that the user should begin a new process of establishing a SECURED connection. In either case, before returning to a NORMAL connection, the user will be notified that the attempt to establish a SECURED connection has failed and given the choice to conduct another attempt to establish a SECURED connection, or instead acknowledge the return to a non-encrypted NORMAL connection.

From the point at which the SECURED connection is successfully established until the SECURED connection mode is terminated, the wireless keyboard 115 will encrypt each generated key reports using the encryption key stored in memory 125. In one embodiment, the keyboard 115 will only encrypt key reports that represent meaningful keys (e.g., alphanumeric keys, and function keys). The keyboard 115 will not encrypt and send encrypted key reports for keys that perform common functions (e.g., the cursor keys (up, down, right, left), the page up, page down, printscreen, and windows key). By not encrypting the common keys that do not hold meaningful information and are often repeated, the system provides fewer patterns for a potential cryptologist to manipulate and exploit.

The keyboard 115 will then transmit each encrypted report to the host system 101, more particularly the receiver 111, which will use the same encryption key, stored in the receiver's 111 memory 113 to decrypt those reports. A strength of the system is that the host computer 102 does not conduct the process of encryption or decryption. After the receiver 111 receives an encrypted key report, the receiver 111 decrypts that report. The receiver 111 only transmits the decrypted key report, or normal key report to the host computer 102.

It should be noted that in one embodiment, since the encryption key is generated by the receiver 111 as opposed to having the wireless keyboard 115 generate the encryption key, which it then transmits to the host system 101, this prevents a third party from being able to force an encryption key from another wireless keyboard 115, or other peripheral device into the host system 101. Also, it should be noted, that, again, since the encryption key is generated by and the process of decryption is also conducted the receiver 111 and not the host computer 102, it is much more difficult for a potential intruder or eavesdropper to steal, replace the encryption key, or manipulate the encryption key or encryption algorithm. Attacking the memory 113 of a receiver 111 unit is much more difficult that accessing, attacking, and manipulating a host computer 102.

In addition, in a system only enabled with uni-directional communication, from the keyboard 115 to the host system 101, in which the encryption key cannot be transmitted directly to the wireless keyboard 115, this method of presenting the user with the encryption key through the display unit 103, accomplishes the hurdle of providing a wireless keyboard 115 with an encryption key generated by the host system 101 without direct transmission from the receiver 111 to the wireless keyboard 115. Moreover, for a system where bi-directional communications are enabled, by presenting information on the encryption key to the user, who then inputs the encryption key into the wireless peripheral, as opposed to having the host system 101 directly transmit the encryption key to the wireless peripheral over a RF link, this embodiment prevents a third party from eavesdropping on the RF transmission and obtaining the encryption key, and limits the knowledge of the key to the person(s) that have direct sight onto the display 103. Finally, since a new encryption key is randomly generated upon each initiation of a secure connection, or secure locking request between a single wireless keyboard 115 and a single host system 101, this process prevents the use of duplicate encryption keys among several receiver 111s, which would invalidate the secure locking concept.

Protection Against Connection Mode Switching

In one embodiment, a SECURED connection mode and a NORMAL connection mode may coexist within the system of the present invention. This provides a user with flexibility as to which mode to select for operation. For SECURED mode, software allows a user to select a password at their own discretion. The user may be prompted for this password by the system 101 when the user elects to operate the system 101 in SECURED mode. Once provided, the system 101 can establish a secure connection (or session). If the user elects to no longer operate in a SECURE mode, a switch back to NORMAL may be made by providing to the system 101 with the selected password. If the connection switches from SECURE mode to NORMAL mode without the user providing the requisite information, the system 101 will provide a warning back to the user. For example, a software mechanism will flash a warning icon on a screen or an audible warning may be triggered or some combination of both visual and audible warning may be presented to the user.

Encryption

The wireless keyboard 115 can utilize a number of encryption schemes to encrypt reports sent to the host system 101. The system can utilize both asymmetric (public key) as well as symmetric (private key) cryptography to encrypt reports. Similarly, the host system 101 can utilize a number of decryption schemes, provided that the specific decryption scheme used matches the encryption scheme utilized by the wireless keyboard 115. In addition, the system can use any one of a number of encryption keys of various lengths, and generated by various methods.

The system 101 may utilize standard, sequential encryption schemes to encrypt data. However, in an alternate embodiment, the system 101 utilizes known non-sequential (not sensitive to desynchronisation), encryption schemes as well. Generally, standard encryption schemes operate on long blocks of data (for example, 64 to 128 bits). In one embodiment, the system 101 may utilize an encryption scheme that synchronizes an encoding scheme of a keyboard 115 with a decoding scheme of the receiver 111. However, if this synchronization is lost because of lost transmission packets, the result could be wrongly decoded characters. For example, an "ESC" character from a keyboard 115 could suddenly be decoded as an "ENTER", resulting in an unwanted operation to be performed by a computer. To assist with securing an encryption scheme, a system 101 may send a counter with each encoded character, to keep the receiver 111 synchronized with a sequence. However, in some embodiments a counter may have the same length as the key, which causes incompatibility with many RF bandwidth ranges, e.g., approximately 600 to 9600 bits per second (bps) range (e.g., 2400 bps). It is noted that in one embodiment sending a counter used as the encryption source data may create a security ride in the system 101.

To help address this issue, in an alternative embodiment non-sequential encryption schemes, which do not utilize sequential keys, nor stream ciphers, may be used. A non-sequential encryption scheme is not prone to suddenly desynchronize because of lost packets. Moreover, such a scheme uses much less computing resources (e.g., memory and execution time) than the sequential encryption scheme.

While the system can uses various encryption schemes, in one embodiment, the system 101 utilizes an encryption scheme that transforms an 8-bit keycode into a 15-bit keycode, which also, to avoid disclosing any information about the encryption by sending recognizable keys, does not encode the "Key Depressed" bit, resulting in the same encryption pattern for both a key "Make" (depressed) and key "Break" (released) report. Turning now to a general description of one embodiment of an encryption system and method in accordance with the present invention, it is noted that the description will be with reference to a keyboard for ease of understanding. Those of skill in the art will recognize that the principles described are also applicable to other wireless devices.

Prior to encryption, each key that is to be encrypted is assigned a keycode 501. Each keycode assigned to a key is represented by a string of bits (e.g., 8 bits). Generally, there are approximately 127 keys to transmit, which are encoded on a one key to one keycode basis on the lower key codes 0–127. The upper codes from 128 to 255 may be set aside for further encoding. Moreover, note that in some embodiments some keys may not need to be encrypted, as they may be general function keys or "user keys" such as Internet keys, Multimedia keys or System keys.

In a first stage of encryption, the encryption module 121, through a scattering process 503, "scatters" or disperses the most probable or common keys (e.g., the Space key, "e", "a", etc.) among a set of upper codes, e.g., 128 upper codes, so that the global histogram of character frequencies are at least partially changed. This makes it difficult to identify an encoded character by its frequency. The encryption module 121 employs random or pseudo random data 505 to determine which one of the upper keycodes (e.g., from 128–255) to assign a given initial keycode 501. Thus, scattering 503 converts the initial 8 bit keycode 501 into another keycode of a predetermined number of bits, e.g., 8 bits. This data may also be scattered using other conventional techniques.

Next, the encryption module expands and mixes the bits of the scattered data with random-like data 511. The encryption module 121 employs a expansion function 509 along with the encryption key 507, e.g., a 32-bit key, previously entered by a user, to expand and mix the 8 bits of scattered data into another set of bits, e.g., 15 bits. It is noted that the expansion and mixing of the random-like data may be conventional. In some embodiments, the encryption module 121 may employ a dilution function 515 to provide an additional level of encryption. The dilution function 515, combines and mixes the predetermined bits, e.g., 15 bits that the expansion function 509 produced with additional predetermined bits, e.g., 15 data bits, selected from bits within the encryption key 507. In one embodiment, the resulting scattered, expanded, and mixed keycode (e.g., the encrypted data) 517 is 15 bits in length.

Those skilled in the art will recognize that the number of bits at each step of the process may vary according to the chosen embodiment and the security level that has to be reached. For example, encryption may be done on 24 bits rather than 15 bits, to increase data security, but the 15 bits may be considered as a minimum to reach a reasonable security level.

Further, repeated reports concerning a key event may be the transmitted (for example, each key event is sent twice to compensate any RF loss). In one embodiment, refresh reports are sent at some predetermined intervals, e.g., 200 ms, to confirm a key depressed status.

Decryption

Referring to FIG. 6, a flow diagram of a decryption process in accordance with the present invention, an encrypted keycode 517 can be decrypted back into the input keycode 501. The encrypted keycode 517 can be decrypted by the inverse of the process by which it was encrypted. The same encryption key 507 utilized to encrypt the encrypted keycode 517 must also be employed to decrypt the encrypted keycode 517.

Through the application of the compact FRAME CONTENT 215, disclosed above, and the application of an efficient encryption algorithm, the present invention is able to establish and maintain a secure connection between a wireless peripheral device 115 and a host system 101 while maintaining a relatively short processing time for each device to encode, send and decode messages sent between them.

Encryption Effectiveness and Robustness

The present invention includes a number of advantages/benefits. First, there is only a 1/4095 probability that a receiver other than one intended to communicate with the wireless device will receive the data transmitted by RF. For example, with approximately 250 millions possible keys, the global probability to have the data accepted on another receiver and correctly decrypted is less than 1/1,000,000,000,000 (one over 1000 billion). Moreover, a randomly chosen key by another other receiver in accordance with the present invention is likely to decode only approximately half of the information, the remaining bits being lost in the decryption process because of the wrong key. This makes a statistical attack very likely to fail, as essential information is missing. Even if the wrong key by chance "looses" less bits, a statistical attack on the decoded characters may be defeated due to the "scattering" process described above.

Additional advantages/benefits of the system and method of the present invention is that a user is unable to force a new encryption key into the receiver because it is generated internally on a random basis. This beneficially allows for generating a new encryption key to create a new SECURED connection when a spying device attempts to enter into the wireless keyboard 115/receiver 111 combination. Specifically, the claimed invention allows for the internal generation of a new encryption key, which in turn changes the SHORT_ID, causing the spying device to be disconnected. Moreover, the claimed invention allows for generating a new encryption key that allows the proper wireless keyboard 115 and receiver 111 to establish a communication link between them.

The present invention also provides security advantages in that breaking an RF link encryption needs advanced and costly hardware instrumentation. It is noted that the system and method of the present invention includes a security level roughly equal to, for example, a 40-bit secret key algorithm. Further, because the SHORT_ID and the encryption key are generated inside the wireless keyboard 115, the overall security of the system could be considered as better than prior solutions.

It can thus be appreciated that a new and novel method and apparatus for securely connecting a wireless keyboard 115 and a host system 101 has been disclosed. Upon reading this disclosure, those of skill in the art will appreciate still additional alternative methods and designs for a wireless secure device in accordance with the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

We claim:

1. A computer implemented method performed by a host system of securely connecting a wireless user input device to the host system, the method comprising:
generating an encryption key and a transmission sequence, where the transmission sequence includes a first portion that represents the encryption key and a second portion that is a confirmation sequence and wherein the transmission sequence is generated in accordance with a check mechanism for verification of the transmission sequence by the wireless user input device;
transmitting the transmission sequence to the wireless user input device;
receiving an input from the wireless user input device, wherein the input includes an encrypted input portion encrypted by the wireless user input device using an encryption key the wireless user input device generated from the first portion of the transmission sequence;
decrypting the encrypted input portion using the encryption key; and
determining if the decrypted input portion matches the second portion of the transmission sequence that is the confirmation sequence.

2. The method of claim 1, wherein the check mechanism comprises one of an error detection mechanism and an internal consistency mechanism.

3. The method of claim 1, wherein generating an encryption key and a transmission sequence further comprises displaying the transmission sequence.

4. The method of 1, wherein the step of generating an encryption key and a transmission sequence is performed responsive to a request to establish a host connection, the request performed responsive to a user activating a connection mechanism located on the wireless user input device.

5. The method of claim 1, further comprising, prior to generating an encryption key,
receiving a password required to begin the process of securely connecting the wireless user input device to the host system,
receiving the password prior to terminating an established connection, and
if the password is not received prior to the termination of a secure connection, notifying a user that the established secure connection has been terminated without authorization.

6. The method of claim 1, wherein the wireless user input device comprises one of a keyboard, a computer mouse, and a joystick.

7. A computer implemented method of attempting to establish a secure connection between a wireless user input device and a host system performed by a wireless user input device, the method comprising:
receiving an input at the wireless user input device, the input including a first input portion and a second input portion;
verifying the validity of the input by performing a check on the input at the wireless user input device;
responsive to a verification of the validity of the input, generating an encryption key from the first input portion and encrypting the second input portion with the encryption key; and
transmitting from the wireless user input device the encrypted second input portion for verification.

8. The method of claim 7, further comprising displaying by the host system at least a portion of the input.

9. The method of claim 7, further comprising, in response to a failed attempt to verify the validity of the input, terminating an attempt to establish a secure connection.

10. The method of claim 7, wherein the transmission sequence includes a first portion, which represents the encryption key, and a second portion that comprises a confirmation sequence, wherein the step of receiving the input comprises:
receiving from a user the first portion; transmitting alternate reports representing the first portion to the host system for display as generic characters; and
receiving from a user the second portion, and transmitting standard reports representing the second portion to the host system for display.

11. The method of claim 10, wherein the wireless user input device comprises a keyboard.

12. The method of claim 10, wherein the wireless user input device comprises one of a computer mouse and a joystick.

13. The method of claim 7, wherein the check comprises at least one of an error detection mechanism, an internal consistency mechanism, calculating a checksum, and detecting a cyclic redundancy.

14. The method of claim 7, wherein the wireless user input device comprises one of a keyboard, a computer mouse, and a joystick.

15. A computer implemented system for securely connecting a wireless user input device to a host system, the computer system comprising:
the wireless user input device including:
a signal generator for generating an input, wherein the input matches a transmission sequence, and the input includes a first input portion matching a first portion of the transmission sequence, and a second input portion matching a second portion of the transmission sequence,
an encryption module for generating an encryption key from the first input portion, and for encrypting the second input portion with the encryption key, and
a transmitter for transmitting the encrypted second input portion to the host system wherein the wireless user input device is configured to verify the consistency of a transmission sequence in accordance with a check mechanism; and
the host system having:
a receiver for receiving data from the wireless user input device,
a signal generator for generating the encryption key and the transmission sequence, wherein the transmission sequence includes a first portion representing the encryption key and a second portion, and
a decryption module for decrypting the encrypted second sequence, and for determining if the decrypted second input portion matches the second portion of the transmission sequence.

16. The system of claim 15, wherein the wireless user input device further comprises a connection mechanism for initiating a secure connection process.

17. The system of claim 15, wherein the host system further comprises a display unit for displaying the transmission sequence such that a user can view the transmission sequence and enter the matching input into the wireless peripheral device.

18. The system of claim 15, wherein communication between the wireless user input device and the host system is unidirectional.

19. The system of claim 15, wherein the transmission sequence is generated in accordance to one of an error detection mechanism and an internal consistency mechanism.

20. The system of claim 15, wherein the system is configured to operate in a secured mode wherein the wireless user input device transmits encrypted data to the host system and a standard mode wherein the wireless user input device transmits unencrypted data to the host system.

21. The system of claim 15, wherein the signal generator is configured to generate the encryption key based on a non-sequential encryption method.

22. The system of claim 21, wherein, to generate the encryption key, the signal generator is configured to perform one of: scattering to convert an initial keycode into a subsequent keycode, using an expansion function to generate an expanded keycode, and using a dilution function on the expanded keycode for use in generating the encryption key.

23. The system of claim 15, wherein in order to verify the consistency of the transmission sequence, the wireless user input device is configured to perform one of calculate a checksum and perform a cyclic redundancy check.

24. The system of claim 15, wherein the receiver comprises the signal generator and the decryption module, and is configured to decrypt data from the wireless user input device.

25. The system of claim 15, wherein the wireless user input device comprise one of a keyboard, a computer mouse, and a joystick.

* * * * *